(12) United States Patent
Browne et al.

(10) Patent No.: US 9,097,214 B2
(45) Date of Patent: Aug. 4, 2015

(54) EXHAUST GAS RECIRCULATION SYSTEM HAVING ACTIVE MATERIAL ACTUATED BY-PASS

(75) Inventors: Alan L. Browne, Gross Pointe, MI (US); Nancy L. Johnson, Northville, MI (US); Patrick G. Szymkowicz, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1002 days.

(21) Appl. No.: 13/224,319

(22) Filed: Sep. 1, 2011

(65) Prior Publication Data

US 2013/0055991 A1 Mar. 7, 2013

(51) Int. Cl.
*F02B 47/08* (2006.01)
*F02M 25/07* (2006.01)
*F02D 9/18* (2006.01)

(52) U.S. Cl.
CPC ............. *F02M 25/0714* (2013.01); *F02D 9/18* (2013.01); *F02M 25/0729* (2013.01); *F02M 25/0771* (2013.01); *F02M 25/0793* (2013.01); *F02M 2025/0762* (2013.01); *Y02T 10/121* (2013.01)

(58) Field of Classification Search
CPC .................. F02M 25/0715; F02M 2025/0757; F02M 25/0714; F02M 25/0729; F02M 25/0771; F02M 25/0793

USPC ................ 123/568.12, 568.11; 251/120–126; 701/108

See application file for complete search history.

(56) References Cited

U.S. PATENT DOCUMENTS

| | | | |
|---|---|---|---|
| 3,479,001 A * | 11/1969 | Dower ............................... 251/4 |
| 7,607,634 B2 * | 10/2009 | Browne et al. ..................... 251/4 |
| 7,845,338 B2 * | 12/2010 | Smith et al. .............. 123/568.12 |
| 8,627,805 B2 * | 1/2014 | Perr et al. ................. 123/568.12 |
| 2008/0251746 A1 * | 10/2008 | Riley et al. ............... 251/129.06 |
| 2009/0308363 A1 * | 12/2009 | Hoffmann ................ 123/568.12 |
| 2010/0116465 A1 * | 5/2010 | Jainek et al. .................. 165/103 |
| 2010/0294476 A1 * | 11/2010 | Gorni et al. ................... 165/276 |
| 2011/0023839 A1 * | 2/2011 | Styles et al. ............. 123/568.12 |
| 2011/0315903 A1 * | 12/2011 | Sohn .............................. 251/11 |

FOREIGN PATENT DOCUMENTS

WO WO 2010069508 A1 * 6/2010

* cited by examiner

*Primary Examiner* — Mahmoud Gimie
*Assistant Examiner* — David Hamaoui

(57) ABSTRACT

An exhaust gas recirculation system adapted for use by an internal combustion engine, and for selectively diverting a recirculated portion of the engine exhaust away from the EGR cooler, includes a by-pass conduit and/or feed line shiftable between open and closed conditions, and an active material actuator.

4 Claims, 2 Drawing Sheets

US 9,097,214 B2

EXHAUST GAS RECIRCULATION SYSTEM HAVING ACTIVE MATERIAL ACTUATED BY-PASS

BACKGROUND OF THE INVENTION

1. Technical Field

The present invention relates to exhaust gas recirculation (EGR) systems, and more particularly, to an EGR system having an active material actuated by-pass.

2. Discussion of Prior Art

Exhaust gas recirculation systems have been developed to reduce harmful emissions caused by internal combustion engines, and more particularly, to reduce $NO_x$ emissions from diesel engines. They function generally by recirculating at least a portion of the exhaust back to the engine, after cooling the portion through plural channels defined by an EGR cooler. Among the primary factors affecting their efficiency is EGR fouling (i.e., the accumulation of ash, and soot along the internal walls of the cooler). EGR fouling is of particular concern during engine start up, due to the propensity of large hydrocarbon particles to accumulate upon the cold or non-heated walls of the cooler. Fouling in turn contributes to other concerns, including increased emissions, compromised engine performance, and EGR failure caused by overheating due to the accumulated thermally resistive layer.

Various methods have been implemented to mitigate fouling, including manipulating the exhaust gas velocity, and using an oxidizing catalyst and/or filter; these measures, however, have presented various concerns, which limit their application and effectiveness. For example, it is appreciated that gas velocity manipulation is ineffective after sintering, and for nano-sized particles; and the addition of a catalyst and filter effects a substantial pressure drop that can influence engine performance. Most recently, a by-pass channel has been implemented to redirect the exhaust away from the EGR cooler during start-up; however, these measures rely upon sensors, associated electrical connections, and a power source to determine the engine temperature from the radiator coolant and manipulate the by-pass. As a result, they too present concerns relating to the added number of parts, and the costs, complexity, and packaging requirements associated therewith.

BRIEF SUMMARY

Responsive to the afore-mentioned concerns, the present invention presents an active material actuated, preferably temperature controlled, EGR by-pass channel that is useful for reducing fouling and thus increasing the effectiveness and life of EGR coolers, while eliminating the need for sensors, electrical connections, and separate power supplies. At engine start-up, the invention is useful for accelerating engine warm-up, and in so doing reducing the time duration of incomplete combustion, incomplete combustion being a known detriment to engine performance. By employing autonomous temperature based active material actuation, the invention is further useful for reducing cost, complexity, and packaging requirements, while increasing robustness in comparison to conventional by-pass systems.

In general, the invention concerns an EGR system adapted for use by an internal combustion engine comprising an intake and producing an exhaust, and for selectively recirculating a portion of the exhaust back to the intake and diverting at least a fraction of the portion away from the cooler. The system includes an EGR cooler fluidly coupled to the intake and the portion of the exhaust, a by-pass conduit, and an active material actuator. The by-pass conduit is fluidly coupled to the intake and the portion of the exhaust, and shiftable between open and closed conditions, wherein the conditions are cooperatively configured such that the conduit and cooler are alternatively coupled to the intake and the portion respectively. The active material actuator is operable to undergo a reversible change in fundamental property when exposed to or occluded from an activation signal, and communicatively coupled to the conduit, and/or a cooler feed line, such that the change causes the conduit and/or line to shift between the open and closed conditions.

Further inventive aspects of the system involving modes of passive actuation, variable active material configurations, and exemplary applications are presented herein. The above described and other features are exemplified by the following figures and detailed description.

BRIEF DESCRIPTION OF THE DRAWINGS

Preferred embodiments of the invention are described in detail below with reference to the attached drawing figures, wherein.

DETAILED DESCRIPTION

Figure 1:
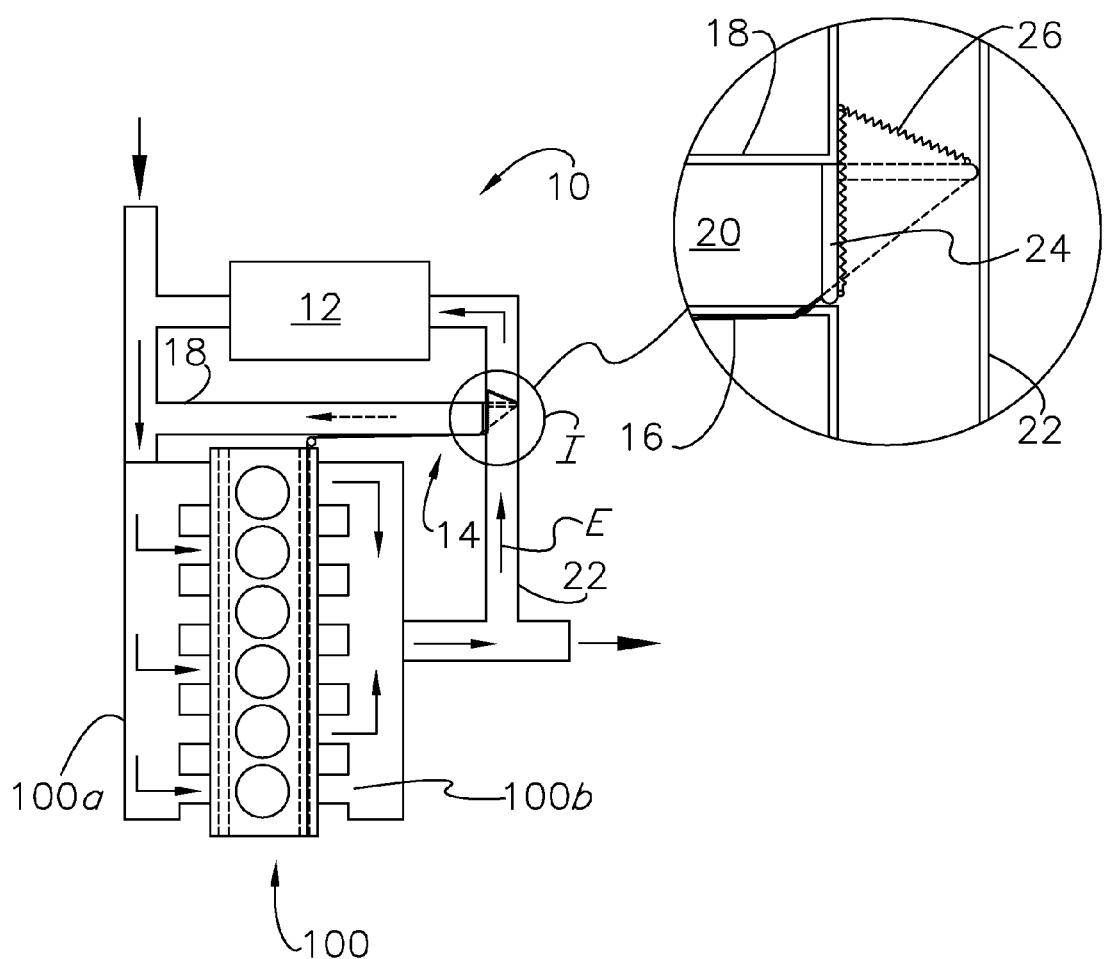
FIG. 1 is an elevation of an EGR system, including an EGR cooler and by-pass conduit alternatively coupled to an engine, and further including a swing gate valve and shape memory alloy actuator drivenly coupled to the valve, in accordance with a first preferred embodiment of the invention.
Figure 2:
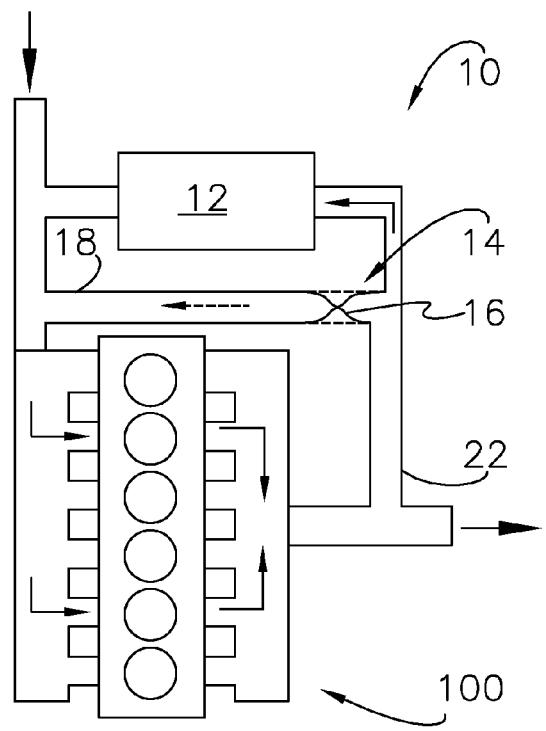
FIG. 2 is an elevation of an EGR system, including an EGR cooler and by-pass conduit alternatively coupled to an engine, wherein the conduit contains a reconfigurable active longitudinal section, in accordance with a second preferred embodiment of the invention.

The present invention concerns an EGR system 10 adapted for use with an internal combustion engine 100 comprising an intake 100a (FIGS. 1-2b), and particularly suited for use with a diesel engine. The system 10 generally includes an EGR cooler 12, and a by-pass 14 comprising an active material actuator or element 16. As previously described, the EGR cooler 12 functions conventionally to recirculate a portion of the exhaust, E, from the engine 100 back to the intake 100a after cooling said portion and mixing with a fresh air source (FIG. 1), so as to effect plural benefits, including lower harmful emissions and faster engine warm-up, as previously described. In FIGS. 1 and 2, two exemplary embodiments of EGR systems 10 employing shape memory alloy and shape memory polymer to trigger the by-pass 14 are presented; however, it is certainly within the ambit of the invention to utilize the specified active materials in other configurations (e.g., other valving arrangements, by-pass configurations, etc.), or to utilize other active materials (e.g., electroactive polymer, piezoelectric composites, etc.) for on-demand use. Moreover, it is appreciated that a variably (i.e., having more than one opened condition, etc.) actuated by-pass 14 may be implemented, and that a variable stroke actuator 16 may be employed accordingly.

As shown in the illustrated embodiments, the by-pass 14 includes a by-pass conduit 18 coupled to the engine 100, and more particularly, fluidly coupled between the exhaust port(s) 100b defined by the engine, and the intake 100a. The preferred conduit 18 and cooler 12 offer parallel paths to the recirculated portion of the exhaust and are alternatively connected to the engine 100; however, it is appreciated that the two paths may remain open, wherein the conduit 18 and cooler 12 are cooperatively configured to convey the portion as desired. The conduit 18 is of suitable durability and resistance, and defines a channel 20 of sufficient cross-sectional area to convey the exhaust over the intended number of cycles without pressure build up. As shown in the illustrated embodiments, the conduit 18 and cooler 12 cooperatively define an ingress T-connection or divergent branches, wherein the recirculated portion of the exhaust, E, may take one of two paths. More particularly, the conduit 18 taps into a cooler feed line 22 that precedes and feeds exhaust into the cooler 12, such that the conduit 18 and line 22 cooperatively define an intersection, I (FIG. 1).

In FIG. 1, the by-pass 14 further includes a control valve 24, and more particularly, a pivotal swing gate valve 24 preferably positioned at the intersection. The valve 24 is sized and configured relative to the line 22 and conduit 18 such that in a first orientation (shown in continuous line type in FIG. 1) the conduit 18 is increasingly occluded, and in a second orientation (e.g., orthogonal to the first as illustrated), the line 22 is increasingly occluded. Thus, the first and second orientations are operable to effect relatively opened and closed by-pass conditions, and more preferably, completely opened and closed conditions, wherein the term "completely" opened or closed indicates that only a negligible (e.g., less than 5% of the) flow is occluded or conveyed, respectively. More preferably, the valve 24 forms a seal with the conduit 18 or line 22 when in the closed condition. It is appreciated that the valve 24 may be positioned within the interior of the longitudinal length of the conduit 18 or line 22, wherein the opposite is always opened; in this configuration, the conduit 18 and line 22 are cooperatively configured such that the recirculated portion flows as desired when the valve 24 is open.

In this embodiment, the active material actuator 16 is used to drive the valve 24 between the first and second orientations, and is preferably a shape memory alloy wire (FIG. 1). The wire 16 may be activated through Joule heating via program logic at start-up by the vehicular charging system (e.g., battery) and controller (not shown), or may be thermally coupled to the engine 100, so as to be passively activated. For example, and as shown in FIG. 1, the wire 16 may be caused to pass through a coolant channel defined by the engine 100 (shown in hidden line type in FIG. 1), so as to be activated by the radiator coolant circulating therein. Here, the system 10 autonomously functions to send exhaust gases directly back to the combustion chambers (rather than through the EGR cooler) when the engine temperature is low (e.g., at start-up). More preferably, a bow-string SMA wire 16 is used to provide mechanical advantage based on the trigonometric relationship defined by the wire 16. As previously mentioned, a multi-wire actuator 16 may be used to produce multiple strokes and variable by-pass conditions. For example, a plurality of SMA wires having differing cross-sectional areas, or constituencies, so as to effect differing transformation temperatures may be drivenly connected to the valve 24, such that as the engine 100 warms up the wires 16 are sequentially activated to incrementally increase exhaust flow to the cooler 12. It is to be understood that the SMA actuator "wire" may be of any of multiple geometrical forms including but not limited to spring, strip, tube, cable, braid, weave, and knit.

A return mechanism 26 is preferably coupled to the valve 24 antagonistic to the actuator 16, and operable to return the valve 24 to the original orientation (e.g., by-pass 14 opened condition). For example, an extension spring 26 may be coupled to the swing-gate 24 opposite the wire 16, as shown in FIG. 1; or a torsion spring may be coaxially aligned with the pivot axis of the gate 24. The spring 26 presents a spring constant able to overcome and stretch the wire 16 when in the Martensitic state, but not the activation force generated during Martensitic to Austenitic transformation. Finally, overload protection (not shown) is preferably provided, so as to offer the wire 16 an alternate output path, where activated and the valve 24 is unable to shift (due to fouling, obstruction, damage, etc.).

In another embodiment, the conduit 18 and a shape memory active material element 16 is integrated. As shown in FIG. 2, for example, the element 16 may form a longitudinal section of the conduit 18, and consists essentially of a shape memory polymer having a memorized pinched shape when activated, and a normally opened shape when deactivated. In this configuration, it is appreciated that the by-pass 14 only reduces the exhaust entering the cooler 12 in accordance with their respective fluid flow characteristics. Alternatively, it is also appreciated that the element 16 may form a longitudinal section of the line 22 and consist of SMP that is trained to perform similarly (FIG. 2a); here, the line 22 when opened is configured based on fluid mechanics to receive a predominate fraction of, more preferably greater than seventy-five percent of, and most preferably, greater than ninety-five percent of the recirculated portion of the exhaust in comparison to the always opened by-pass conduit 18. In FIG. 2a, for example, the conduit 18 defines a diameter less than, and more preferably, not greater than fifty percent, and most preferably not greater than twenty-five percent of the diameter of the line 22, and intercepts the line 22 at an acute angle relative to fluid flow, so that at least a predominate fraction of the recirculated portion is caused to flow in the by-pass conduit 18 only when the line 22 is generally occluded.

Figure 2B:
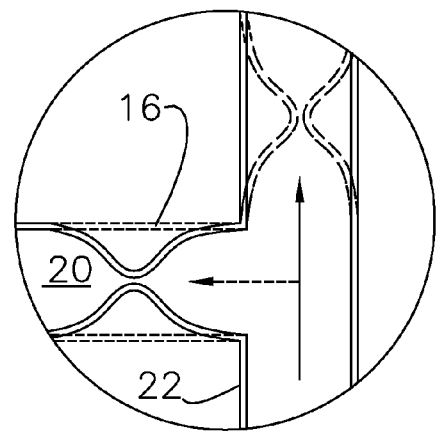
FIG. 2b is an enlarged caption view of an EGR system, including an EGR cooler line and by-pass conduit defining a reconfigurable active T-connection, in accordance with a third preferred embodiment of the invention.
Figure 2A:
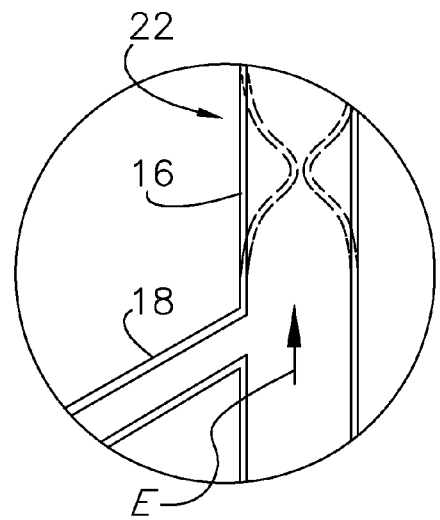
FIG. 2a is an enlarged caption view of an EGR system, including an EGR cooler feed line having a reconfigurable active longitudinal section, and a by-pass conduit angularly intercepting the line, in accordance with a second preferred embodiment of the invention.

More preferably, and as shown in FIG. 2b, the SMP section 16 presents the T-connection, a normally pinched shape along the line 22 and an opened shape along the conduit 18 when deactivated, and a memorized opened shape along the line 22 and memorized pinched shape along the conduit 18 when activated. As such, in this configuration, the by-pass 14 is configured to generally allow the recirculated portion of the exhaust to flow through the conduit 18 when the SMP section 16 is deactivated and through the line 22 when activated. It is again appreciated that the SMP section 16 may be passively activated and the by-pass 14 actuated by the heat energy by-product of the engine 100; to that end, a thermally insulative and flexible cover (not shown) may be interiorly disposed within the SMP section(s) 16, so as to form superjacent layers therewith, and ensure that heat energy produced by the outside engine components, and not the exhaust itself triggers the by-pass 14. As previously mentioned, a return mechanism 26 may be provided to reverse the effects of actuation. Where recirculation is not desired, and separate active material elements 16 comprise longitudinal sections of the conduit 18 and line 22, it is appreciated that both the conduit 18 and line 22 may be caused to concurrently present a pinched shape and closed condition. Finally, with respect to the afore-mentioned SMP examples, it is appreciated that manipulation of system pressure interior to the conduit 18 and line 22, and the timing of activation must be coordinated to effect proper functionality.

As used herein the term "active material" is defined as those materials or composites that exhibit a reversible change in fundamental (i.e., chemical or intrinsic physical) property when exposed to or precluded from an activation signal. Suitable active materials for use with the present invention include but are not limited to shape memory materials that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like. Other active materials exhibiting variable degrees of workability, including MR/ER fluids, shear thinning fluids, and electro-active gels may also be used.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-pending. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two-way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

Barium titanates and bismuth titanates are common types of piezoelectric ceramics Modified barium-titanate compositions combine high-voltage sensitivity with temperatures in the range of −10° C. to 60° C. Barium titanate piezoelectric ceramics are useful for hydrophones and other receiving devices. These piezoelectric ceramics are also used in low-power projectors. Bismuth titanates are used in high temperature applications, such as pressure sensors and accelerometers. Bismuth titanate belongs to the group of sillenite structure-based ceramics ($Bi_{12}MO_{2}0$ where M=Si, Ge, Ti).

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. An exhaust gas recirculation (EGR) system adapted for use by an internal combustion engine comprising an intake and producing an exhaust, and for selectively recirculating at least a predominant portion of the exhaust back to the intake, said system comprising:

an EGR cooler fluidly coupled to the intake and said portion of the exhaust; and
a by-pass including a conduit fluidly coupled to the intake and said portion of the exhaust, the conduit including:
  a shape memory polymer longitudinal section that is shiftable between an opened shape when deactivated and a memorized pinched shape when activated; and
  a thermally insulative and flexible cover interiorly disposed within the shape memory polymer longitudinal section;
  wherein the shape memory polymer longitudinal section is activated by a heat energy by-product of the engine and wherein the thermally insulative and flexible cover prevents the portion of the exhaust from activating the shape memory polymer longitudinal section.

2. The system as claimed in claim 1, wherein:
the EGR cooler includes a feed line;
a T-connection is cooperatively defined by the conduit and feed line; and
the feed line includes:
  a second shape memory polymer longitudinal section that presents a pinched shape when deactivated and an opened shape when activated; and
  a second thermally insulative and flexible cover interiorly disposed within the second shape memory polymer longitudinal section;
  wherein the second shape memory polymer longitudinal section is activated by the heat energy by-product of the engine and wherein the second thermally insulative and flexible cover prevents the portion of the exhaust from activating the second shape memory polymer longitudinal section.

3. The system as claimed in claim 1, further comprising:
a return mechanism drivenly coupled to the conduit, and operable to reverse an effect of activation.

4. The system as claimed in claim 3, wherein the return mechanism includes a spring.

\* \* \* \* \*